July 9, 1963  E. E. FORRER  3,096,943
A TREE LIGHTING FIXTURE
Filed Oct. 24, 1961
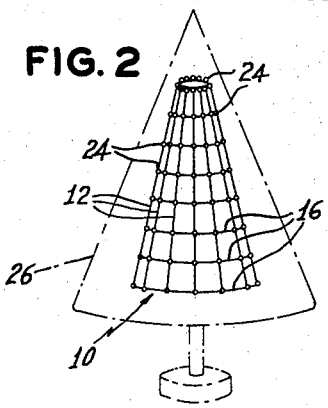
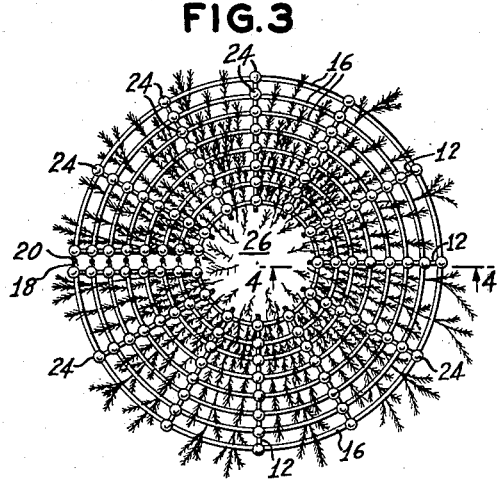
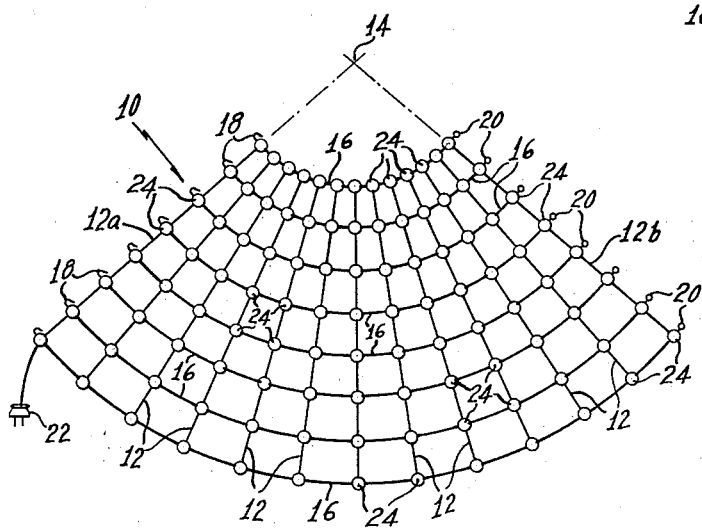
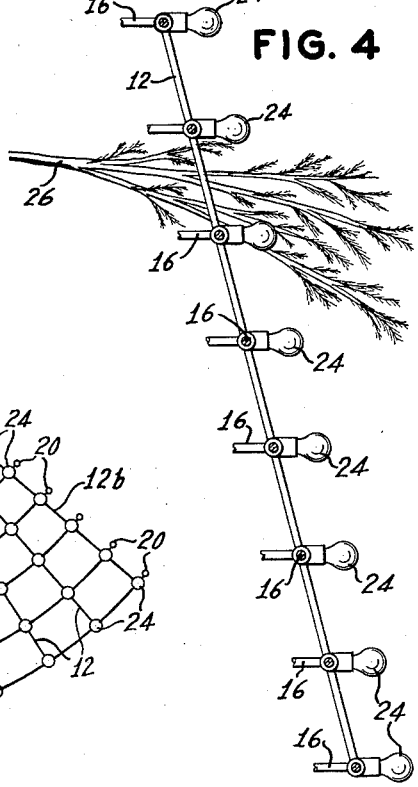
INVENTOR.
EDWARD E. FORRER
BY Jerome Bauer
ATTORNEY

United States Patent Office 3,096,943
Patented July 9, 1963

3,096,943
A TREE LIGHTING FIXTURE
Edward E. Forrer, 16 Maple Drive, New Hyde Park, N.Y.
Filed Oct. 24, 1961, Ser. No. 147,228
2 Claims. (Cl. 240—10)

This invention relates to lighting fixtures and more particularly to a lighting fixture for Christmas trees.

It is presently the practice to hang Christmas lights about a Christmas tree by winding a continuous string of lights through the branches and wrapping them in coil fashion about the tree from the top to bottom until the whole of the tree is covered. The application and removal of these lights to the tree is time consuming and oftentimes results in breaking one or more of the branches of the tree, stripping the pine needles from the branches and frequently in breaking a portion of the length of the continuous wire on which the lights are hung. Present tree decoration techniques and Christmas tree lighting wires now make it difficult to evenly light and properly symmetrically decorate the tree in order to illuminate the same fully.

It is an object of the invention to provide a lighting fixture that is relatively inexpensive and simple in construction, one that is capable of being applied as a unit to a Christmas tree or other structure and removed therefrom as a unit.

Another object of the invention is to provide a lighting fixture in the form of a net that may be wrapped as a whole about a Christmas tree to decorate the same.

Still another object of the invention is to provide a unitary net of illuminating elements that may be quickly and easily wrapped about to conform to the contour of a Christmas tree, the same net of illuminating elements being capable of being removed as a unit and stored for future use.

Other and further objects of this invention reside in the structures and arrangements hereinafter more fully described with reference to the accompanying drawing in which:

FIG. 1 is a plan view of a lighting fixture constructed according to the teaching of the invention, FIG. 2 is a front elevation of a Christmas tree showing the inventive lighting fixture positioned thereabout, FIG. 3 is a top view of FIG. 2, and FIG. 4 is an enlarged cross section of FIG. 3 taken along lines 4—4.

Referring to the drawing and in particular to FIG. 1, the lighting fixture there shown is generally identified by the numeral 10. The lighting fixture 10 is shown in FIG. 1 in plan view illustrating its details as though the same were lying flat on a planar surface and not in use. In the plan view of FIG. 1, the lighting fixture 10 assumes the appearance of a net.

The lighting fixture 10 is composed of a plurality of pliable risers 12. Each riser 12 is radially directed and increasingly arcuately spaced from the next adjacent riser in a lengthwise direction away from a centerpoint 14. For purposes of explanation, the endmost risers 12 have been identified with the numerals 12a and 12b. The risers 12 are retained in relative spaced relationship by a plurality of pliable connectors 16. Each connector 16 is arcuately directed and increasingly radially spaced from the next adjacent connector along the lengths of the risers 12 in a direction away from the centerpoint 14. The risers 12 and connectors 16 are secured together at the points where they cross each other to form a pliable network that is shaped substantially like that of a quadrant of an annulus with the endmost risers 12a and 12b defining the ends of the net.

The criss crossing risers 12 and connectors 16 are secured together from relative movement and they define spaces between them. Although these spaces are not numbered, they will be apparent from the figures of the drawing. The spaces defined between the criss crossing risers and connectors are of varying size increasing in area as they are disposed progressively greater radial distances away from the centerpoint 14. The value of this arrangement of structure and the increasing area of the spaces defined between the risers and connectors should be readily obvious to those skilled in the art. One should be quick to recognize that the progressively larger area spaces of the lighting fixture 10 are positioned at the lower portion thereof while the progressively smaller area spaces are positioned at the upper portion thereof. The larger area spaces will be adapted to accommodate the larger tree branches at the lower portion of the Christmas tree while the smaller spaces will accommodate for projection therethrough the smaller branches at the upper portion of the Christmas tree.

Provided along the length of the riser 12a and extending arcuately slightly therebeyond are a plurality of engaging means in the form of hooks 18. In a similar but opposite manner, the riser 12b is provided along its length with a plurality of engaging means 20 in the form of engageable loops. Each hook 18 is radially aligned with a respective loop 20 for cooperative engagement therewith to enable the securement of the lighting fixture 10 in position about a Christmas tree.

In rough construction, it has been found convenient to form the net shaped fixture 10 of a non-conductive material. Thereafter, a pair of electrically conductive insulated wires (not shown) are entwined about the risers 12 and connectors 16. The electrically conductive wires are provided with an electrical plug 22 that serves to connect the same with any convenient electrical outlet or source of electricity (not shown). In actual manufacture, it is practical to form the network of risers 12 and connectors 16 of the aforementioned insulated electrically conductive wires and then join the same together to prevent their relative movement at the points where they cross each other.

When the risers 12 and connectors 16 are actually formed of electrically conductive wires, it is then quite simple to secure to them the illuminating elements, such as the Christmas lights 24. Each of the Christmas lights 24 is connected both with the electrically conductive risers and connectors 12 and 16 in any well known manner. However, if the risers 12 and connectors 16 are actually the electrical conductors, it is then more practical to connect the illuminating means 24 to the same at their points of crossing and their relative securement.

In use, the lighting fixture 10 is adpted to be quickly, easily and conveniently pliably wrapped as a unitary structure about a Christmas tree 26 by placing the narrow top of the lighting fixture 10 in position about the smaller diameter narrow top of the tree. The smaller and shorter upper branches of the tree are easily accommodated in and pass through the smaller spaces defined between the upper more closely spaced risers 12 and connectors 16. This is illustrated in FIGS. 2, 3 and 4 wherein the lighting fixture 10 is shown to be positioned slightly within the outer confines of the tree 26 and, therefore, decoratively illuminates the interior portions of the tree as well as the exterior portions thereof.

With the light fixture 10 wrapped as a unit about the tree 26, its endmost risers 12a and 12b are fastened together by engaging each of the hooks 18 with a respective one of the loops 20. The lighting fixture 10 requires no exterior support other than that afforded by the branches of the tree inserted into and projecting through the spaces defined between criss crossing risers 12 and connectors 16. After the lighting fixture 10 is wrapped about the tree 26, it assumes a frusto-conical shape as shown in FIG. 2.

When once the hooks 18 and loops 20 are engaged with each other, the lighting fixture 10 is ready for unitary use simply by connecting the plug 22 with any source of electricity. The relative spacing and arrangement of the lights 24 is decoratively even and, therefore, unusually attractive in appearance. When the plug 22 is connected with a source of electricity, all of the illuminating means 24 are activated. With what has been described, it will be clear that the lighting fixture 10 is easily and quickly applied to any Christmas tree as a unitary structure resulting in an unusually decorative appearance. In like manner, the same is simply removed from the tree 26 quickly and without effort since it is merely necessary to disengage the hooks 18 from the cooperable engaging loops 20 to enable the lighting fixture 10 to be removed as a unitary net from the supporting branches of the tree.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a Christmas tree lighting fixture, a plurality of relatively spaced radially directed risers, a plurality of relatively spaced arcuately directed connectors, said risers and connectors crossing each other to form a single unitarily formed substantially quadrant shaped net, said risers and connectors being of a pliable material, a plurality of electrical conductors included in said net at said crossing risers and connectors, said quadrant shaped net being formable into a substantially frusto-conical shape, releasable engaging means on said net to releasably retain the same in said frusto-conical shape, means to connect said electrical conductors to a source of electricity, and illuminating means electrically connected with said electrical conductors, said net being adapted to be positioned about and supported on the branches of said tree.

2. In a lighting fixture, a plurality of arcuately spaced radially directed risers, a plurality of arcuately directed radially spaced connectors, said risers and connectors being arranged in crossing relationship and secured together at said crossings to form a substantially quadrant shaped net, said risers and connectors including electrically conductive means, means to connect said electrical conductors to a source of electricity, and illuminating means electrically connected with said electrical conductors for illumination when said conductors are connected with said source of electricity, said crossing risers and connectors being pliable and defining spaces therebetween, said net being a single pliable construction to form a substantially frusto-conical shape to accommodate the projection of branches of a Christmas tree through said spaces and for support by said tree by the branches thereof, and releasable engaging means on said net to releasably retain the same in said frusto-conical shape about a Christmas tree.

References Cited in the file of this patent

UNITED STATES PATENTS

| | | |
|---|---|---|
| 685,247 | Borrman | Oct. 29, 1901 |
| 1,134,834 | Fisher | Apr. 6, 1915 |
| 1,654,427 | Modlarz | Dec. 27, 1927 |
| 2,414,866 | Glaser | Jan. 28, 1947 |
| 2,468,773 | Musinski | May 3, 1949 |
| 2,864,192 | Shoalts | Dec. 16, 1958 |
| 2,962,580 | Jones | Nov. 29, 1960 |